Patented Nov. 12, 1946

2,411,047

UNITED STATES PATENT OFFICE 2,411,047

ALKYLATION OF AROMATICS

Carl B. Linn, Riverside, and Vladimir N. Ipatieff, Chicago, Ill., assignors to Universal Oil Products Company, Chicago, Ill., a corporation of Delaware No Drawing. Application December 20, 1944, Serial No. 569,098

14 Claims. (Cl. 260—671)

The present invention relates to the interaction of alkylatable aromatic hydrocarbons with olefinic hydrocarbons in the presence of a novel alkylation catalyst. It is more particularly concerned with the production of alkylatable hydrocarbons which can be used as intermediates in the manufacture of synthetic rubber or can be incorporated into gasolines to form premium fuels. This application is a continuation-in-part of our earlier application Serial No. 470,223, filed December 26, 1942, now Patent No. 2,366,736, granted January 6, 1945.

The alkylation of aromatics, particularly benzene with ethylene, has become very important at the present time. The primary product of the reaction, ethyl benzene, upon dehydrogenation yields substantial quantities of styrene which is now extensively employed in the manufacture of synthetic rubber. Ethyl benzene, isopropyl benzene and similar compounds have been found to have excellent antiknock properties and are valuable as addition agents to gasolines.

In one embodiment the present invention comprises a process for the alkylation of an alkylatable aromatic compound with an olefin, particularly ethylene, in the presence of boron trifluoride and an acid fluoride.

The two components which, when combined, form our novel alkylation catalyst when used individually do not catalyze the interaction of an aromatic with an olefin to any great extent. We have found that upon combination these materials produce a very effective catalyst as is borne out by the experimental data presented hereinafter in this specification. These catalysts possess qualities which make their use on commercial operation particularly attractive. Perhaps the most important characteristic of these catalysts is their ability to catalyze the interaction of benzene with ethylene, as well as with higher boiling olefins. With most of the prior art alkylation catalysts, for example, sulfuric acid, it has been found that while these catalysts are effective in causing the interaction of benzene with propylene, butylene, etc., they do not possess the ability to effect interaction of benzene and ethylene.

Benzene and other aromatics may be readily obtained by the distillation of coal tar products or may be found in substantial quantities in straight-run gasolines from various crude oils, particularly the coastal crude oils. These aromatics may also be produced by the catalytic dehydrocyclization of normal paraffins having at least 6 carbon atoms to the molecule or by the catalytic dehydrogenation of naphthenic or cyclic olefins having a ring structure comprising at least 6 carbon atoms. The olefins may be obtained in large quantities in the gaseous products from cracking and other hydrocarbon conversion operations or by the dehydrogenation of such compounds as ethyl alcohol. Although the catalysts of the present invention are particularly applicable when ethylene is employed as the alkylating agent, our invention is broader in scope and the catalyst may be used generally for reacting aromatic hydrocarbons or aromatic compounds such as halogenated aromatics, phenols, etc., with either normally gaseous or normally liquid olefinic hydrocarbons, particularly olefins containing from 2 to about 12 carbon atoms per molecule or compounds capable of forming olefins under the particular set of conditions selected for the operation. In certain instances, polymers of the lower boiling olefins may be employed, although not necessarily under the same operating conditions. For example, when olefinic polymers are reacted with the aromatic, it is generally desirable to employ a somewhat higher ratio of aromatic to olefin in the hydrocarbon charging stock than would ordinarily be used when monomeric olefinic reactants are employed.

As previously stated, boron trifluoride or the acid fluorides alone are not alkylating catalysts. However, when employing the two together, an active catalyst is obtained. While the catalyst has been found to possess some activity regardless of the proportions of boron trifluoride and acid fluoride, the best results are obtained when a definite molal excess of $BF_3$ over the acid fluoride is maintained.

The alkylation reaction in the presence of the boron trifluoride alkali metal acid fluoride catalyst may be carried out at a temperature from about $-10°$ C. to about $400°$ C., although a more preferable operating range is from about $-10°$ C. to about $100°$ C. It is highly desirable that the reaction be carried out under sufficient pressure to maintain a substantial portion of the reactant in the liquid phase, for example, from about 10 to about 200 atmospheres, depending upon the amount of boron trifluoride present, the temperature of the reaction and other factors. In order to minimize polymerization of the olefinic reactants, a hydrocarbon feed to the alkylation zone should contain a substantial excess of aromatic hydrocarbons over the olefinic hydrocarbons, for example, a molal ratio of aromatics to olefins of about 2:1 to about 20:1 or higher. If desired the olefinic reactants may be introduced at spaced points throughout the alkylation zone in order to maintain the desired high aromatic to olefin ratio.

In the case of the preferred operation wherein potassium or sodium acid fluoride is maintained as a fixed bed, the effluent material from the alkylation zone is introduced into a separation step wherein hydrocarbon reaction products are separated from boron trifluoride which can then be recycled to the alkylation stage as hereinbefore described. The hydrocarbon reaction products are fractionated to separate desired alkylation products from unconverted aromatics. The latter are recycled to the alkylation zone in order to maintain the desired high aromatic to olefin ratio in the hydrocarbon feed stock. Light hydrocarbon contaminants in the charging stock to the process may also be removed in the fractionation step in order to prevent their accumulation in the alkylation system. For example, if appreciable amounts of ethane, propane, or normal butane are introduced with the fresh hydrocarbon feed it will be desirable to remove these constituents during the fractionation operation. In general it is not intended to limit the broad scope of the present invention to any particular method of contacting the catalyst and the reactants.

The following examples are introduced in order to illustrate the nature of the present invention as it is applied to the alkylation of benzene with ethylene.

In these examples a rotating autoclave of about 850 cc. capacity was employed as a reaction zone. The autoclave was rotated at the specified temperature for about 4 to 6 hours, then cooled to room temperature and the pressure released through bubblers containing caustic solution. The non-condensible gas was measured in a gas meter and subsequently analyzed. The autoclave was then opened and the liquid reaction product removed therefrom, washed, dried and distilled.

The following table presents the operating conditions employed and the results obtained when alkylating benzene and ethylene in the presence of boron trifluoride.

Experiments 1 and 2 indicate that the individual materials do not possess any activity as alkylation catalysts, but it is only when used in conjunction with one another that an active alkylating catalyst is obtained.

|  | Experiment number | | | | |
|---|---|---|---|---|---|
|  | 1 | 2 | 3 | 4 | 5 |
| Conditions: | | | | | |
| Temperature, ° C | 25 | 25 | 25 | 300 | 120 |
| Hrs. rotated at temp | 6 | 6 | 6 | 4 | 6 |
| Charge, g.: | | | | | |
| KHF$_2$ | 40 | 0 | 15 | 40 | 15 |
| BF$_3$ | 0 | 18 | 55 | 43 | 60 |
| Benzene | 160 | 160 | 160 | 160 | 160 |
| Ethylene | 24 | 24 | 24 | 38 | 30 |
| Recovery, g.: | | | | | |
| Ethylene | 24 | 24 | 0 | 6 | 3 |
| Benzene | 160 | 160 | | | |
| Ethylbenzene | | | 52 | 78 | 52 |
| Diethylbenzenes | | | 16 | 26 | 15 |
| Higher ethylated benzene | | | 4 | 14 | 9 |

We claim as our invention:

1. A process for the synthesis of organic compounds which comprises reacting an alkylatable aromatic compound with an alkylating agent under alkylating conditions in the presence of boron trifluoride and an acid fluoride.

2. A process for the synthesis of hydrocarbons which comprises reacting an alkylatable aromatic hydrocarbon with an olefinic hydrocarbon under alkylating conditions in the presence of boron trifluoride and an acid fluoride.

3. A process for the alkylation of aromatic hydrocarbons with olefinic hydrocarbons which comprises contacting aromatics and olefins at a temperature of from about −10° C. to about 400° C. in the presence of boron trifluoride and an acid fluoride.

4. A process of claim 1 further characterized in that said acid fluoride comprises an acid fluoride of an alkali metal.

5. A process for the synthesis of organic compounds which comprises reacting an aromatic compound with an alkylating agent under alkylating conditions in the presence of boron trifluoride and an acid fluoride of potassium.

6. A process for the synthesis of hydrocarbons which comprises reacting an aromatic hydrocarbon with an olefinic hydrocarbon under alkylating conditions in the presence of boron trifluoride and an acid fluoride of potassium.

7. A process for the synthesis of organic compounds which comprises reacting an aromatic compound with an alkylating agent under alkylating conditions in the presence of boron trifluoride and an acid fluoride of sodium.

8. A process for the synthesis of hydrocarbons which comprises reacting an aromatic hydrocarbon with an olefinic hydrocarbon under alkylating conditions in the presence of boron trifluoride and an acid fluoride of sodium.

9. A process for the synthesis of hydrocarbons which comprises alkylating benzene with ethylene in the presence of boron trifluoride and an alkali metal acid fluoride.

10. A process for the synthesis of hydrocarbons which comprises alkylating benzene with propylene in the presence of boron trifluoride and an alkali metal acid fluoride.

11. A process for the synthesis of hydrocarbons which comprises alkylating benzene with ethylene in the presence of boron trifluoride and an alkali metal acid fluoride.

12. A process for the synthesis of hydrocarbons which comprises passing aromatic hydrocarbons, olefinic hydrocarbons and boron trifluoride through an alkylating zone containing therein a fixed bed of solid contact material comprising an alkali metal acid fluoride, separating boron trifluoride from the hydrocarbon reaction products, recycling said boron trifluoride to the alkylating zone and fractionating said hydrocarbon reaction products to recover desired alkylation products.

13. The process of claim 12 wherein said solid contact material consists essentially of potassium acid fluoride as its active ingredient.

14. A process of claim 12 wherein said solid contact material consists essentially of sodium acid fluoride as its active ingredient.

CARL B. LINN.
VLADIMIR N. IPATIEFF.